(12) United States Patent
Tseng et al.

(10) Patent No.: US 8,039,537 B2
(45) Date of Patent: Oct. 18, 2011

(54) MODIFIED BISMALEIMIDE RESINS, PREPARATION METHOD THEREOF AND COMPOSITIONS COMPRISING THE SAME

(75) Inventors: Feng-Po Tseng, Taoyuan County (TW); Lu-Shih Liao, Taichung (TW); Kuo-Chan Chiou, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 105 days.

(21) Appl. No.: 12/709,512

(22) Filed: Feb. 22, 2010

(65) Prior Publication Data

US 2011/0147646 A1 Jun. 23, 2011

(30) Foreign Application Priority Data

Dec. 18, 2009 (TW) .............................. 98143614 A

(51) Int. Cl.
- *C08K 3/20* (2006.01)
- *C08K 3/38* (2006.01)
- *C08K 3/14* (2006.01)

(52) U.S. Cl. ........ 524/430; 524/404; 524/424; 524/428; 524/437; 528/113; 528/117; 528/123; 528/124; 549/543; 549/551; 549/555

(58) Field of Classification Search .................. 524/404, 524/424, 428, 430, 437; 528/113, 117, 123, 528/124; 549/543, 551, 555

See application file for complete search history.

(56) References Cited

U.S. PATENT DOCUMENTS

| | | | |
|---|---|---|---|
| 5,112,924 A | 5/1992 | Chu et al. | |
| 5,268,432 A | 12/1993 | Pan et al. | |
| 5,316,711 A | 5/1994 | Throne | |
| 5,364,700 A | 11/1994 | Domeier | |
| 6,252,010 B1 | 6/2001 | Takeuchi et al. | |
| 6,809,130 B2 * | 10/2004 | Chiou et al. | 523/443 |
| 2002/0147283 A1 | 10/2002 | Kim et al. | |
| 2004/0110874 A1 | 6/2004 | Chiou et al. | |
| 2005/0148696 A1 | 7/2005 | Hsiao et al. | |
| 2008/0302558 A1 | 12/2008 | Takeuchi et al. | |

FOREIGN PATENT DOCUMENTS

| | | |
|---|---|---|
| JP | 2003-138241 | 5/2003 |
| JP | 2004-217861 | 8/2004 |
| JP | 2004-217862 | 8/2004 |
| TW | I223975 | 11/2004 |

\* cited by examiner

*Primary Examiner* — Peter Szekely

(57) ABSTRACT

A modified bismaleimide resin of Formula (I) or (II) is provided.

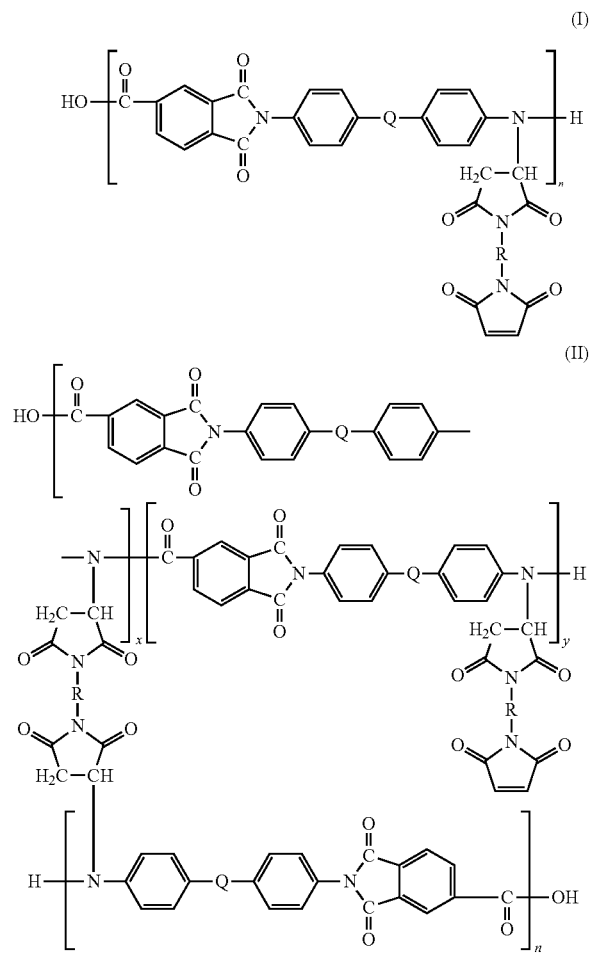

In Formula (I) or (II), Q is $-CH_2-$, $-C(CH_3)_2-$, $-O-$, $-S-$, $-SO_2-$ or null, R is $-(CH_2)_2-$, $-(CH_2)_6-$, $-(CH_2)_8-$, $-(CH_2)_{12}-$, $-CH_2-C(CH_3)_2-CH_2-CH(CH_3)-CH_2-CH_2-$,

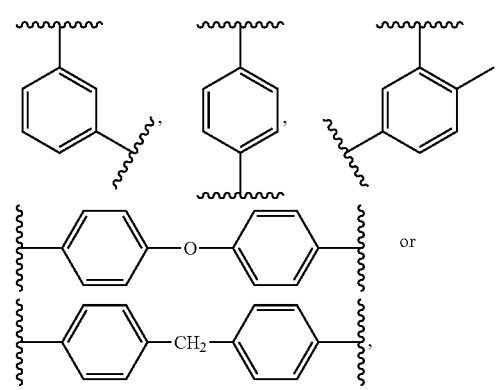

$10<n<500$, and $x+y=n$. The invention also provides a method for preparing a modified bismaleimide resin and a composition including the modified bismaleimide resin.

12 Claims, No Drawings

MODIFIED BISMALEIMIDE RESINS, PREPARATION METHOD THEREOF AND COMPOSITIONS COMPRISING THE SAME

CROSS REFERENCE TO RELATED APPLICATIONS

This application claims priority of Taiwan Patent Application No. 098143614, filed on Dec. 18, 2009, the entirety of which is incorporated by reference herein.

BACKGROUND OF THE INVENTION

1. Field of the Invention

The invention relates to a modified resin, and more particularly to a modified bismaleimide resin, a preparation method thereof and a composition comprising the same.

2. Description of the Related Art

According to the implementation of the Restriction of Hazardous Substance (RoHS) Directive, using environmentally friendly materials has become a basic requirement. Although the Restrictions of the Hazardous Substance (RoHS) Directives of various nations are different, the substantial contents are similar. For example, most nations prohibit the use of lead, cadmium, mercury, hexavalent chromium, polybrominated biphenyls (PBB) and polybrominated diphenyl ethers (PBDE). Thus, developments of green halogen-free copper clad laminate (CCL) materials and lead-free manufacturing processes are required. However, lead-free solder alloy has a higher melting point than that of conventional tin-lead solder, impacting circuit substrate materials and other auxiliary elements. While tin-lead solder has been replaced by a lead-free solder alloy, without other supporting measures, the reliability of the substrate has deteriorated. Thus, the development of substrate materials capable of bearing multiple high temperature manufacturing processes is required. During high temperature manufacturing processes, z-axis expansion and decomposition of substrate materials may occur. A high soldering temperature leads to an increased z-axis expansion of substrate materials, deteriorating through hole reliability. Also, substrate materials are easily decomposed during high-temperature soldering operations, deteriorating material properties, for example, increased moisture content, reduced glass transition temperature and deteriorated dielectricity. Thus, development of substrate materials with high thermal resistibility is currently desirable. The thermal resistibility is exhibited by glass transition temperature (Tg). Generally, higher glass transition temperature exhibits higher thermal resistibility of materials. Thus, development of halogen-free copper clad laminate (CCL) materials with high glass transition temperature is important to meet the requirement of halogen-free substrate materials and lead-free manufacturing processes.

Electronic end products with light weight, a thin profile, small volume, high computation speed and wireless ability are desirable. However, with reduced volume and increased computation speed, a great quantity of heat is produced. The reliability and lifetime of such products is reduced due to the overheating of integrated circuit elements as the heat gradually accumulates. Thus, achieving effective heat dissipation to maintain a stable system has become increasingly important. The main cause of damage or loss of function of electronic devices is high temperature rather than vibration, humidity or dust. Thus, the development of substrate materials with high thermal conductivity is desirable in the thermal management industry.

In a conventional halogen-free environmentally safe material composition, a phosphorus-containing flame retardant is substituted for the original halogen-containing flame retardant. However, while a phosphorus-containing flame retardant is utilized, inorganic powder must also be added to pass the UL-94V0 test. The inorganic powder may comprise hydroxides, for example silicon dioxide or aluminum hydroxide. However, while silicon dioxide is added, the hardness of the formed halogen-free substrate is increased. This is unfavorable because it makes it difficult to drill through the material during the later production phase. When aluminum hydroxide is added, the substrate liberates moisture at low temperature during heating processes. This makes it hard to pass the pressure cooker test (PCT). Currently, the glass transition temperature (Tg) of halogen-free epoxy resin copper clad laminate (CCL) materials merely achieves about 180° C. (less than 200° C. of materials highly thermal resistibility) measured by TMA.

Currently, BT resin developed in 1982 by Japan's Mitsubishi Gas Chemical Company and Bayer Chemical Company technical guidance is an environmentally safe material that is halogen-free and phosphorus-free with a maximum utilized quantity. BT resin polymerized by bismaleimide (B) and triazine (T) and possesses a high glass transition temperature (Tg) of 255-330° C., low dielectric constant and low dissipation factor. However, the brittleness and water absorption thereof is high. Although rigid BT resin has high thermal resistibility, the tensile strength thereof is low, resulting in poor processability. Also, the water absorption of the polar imide group of BT resin is high. Adding epoxy resins may overcome such drawbacks. However, the thermal resistibility thereof is consequently reduced (the glass transition temperature (Tg) thereof is reduced to 170-210° C.). Currently, the glass transition temperature (Tg) of the commercial BT resin substrate material achieves 210° C. above, for example those developed by Mitsubishi Gas Chemical (Tg of 210° C.) and Sumitomo Bakelite (Tg of 220° C.). Additionally, a BN resin-based substrate material with halogen-free, phosphorus-free and high glass transition temperature (Tg) is developed by Mitsui Chemical, with a glass transition temperature (Tg) of 300° C. (measured by DMA). However, adding aluminum oxide is also required to achieve UL-94 V0 test, for example US 2006/0084787A1 "Novel cyanate ester compound, flame-retardant resin composition, and cured product thereof" and US 2008/02621397A1 "Flame retardant crosslink agent and epoxy resin compositions free of halogen and phosphorous".

A thermally cured bismaleimide (BMI) with high glass transition temperature (Tg) is popular. Although rigid BMI has highly thermal resistibility, the tensile strength thereof is low, resulting in poor processability. Some BMI modification methods have been addressed during the last 20 years. Although adding diamine can improve the mechanical properties and adhesion of BMI, the cost and processability thereof cannot meet the market requirements.

BRIEF SUMMARY OF THE INVENTION

One embodiment of the invention provides a modified bismaleimide resin of Formula (I) or (II).

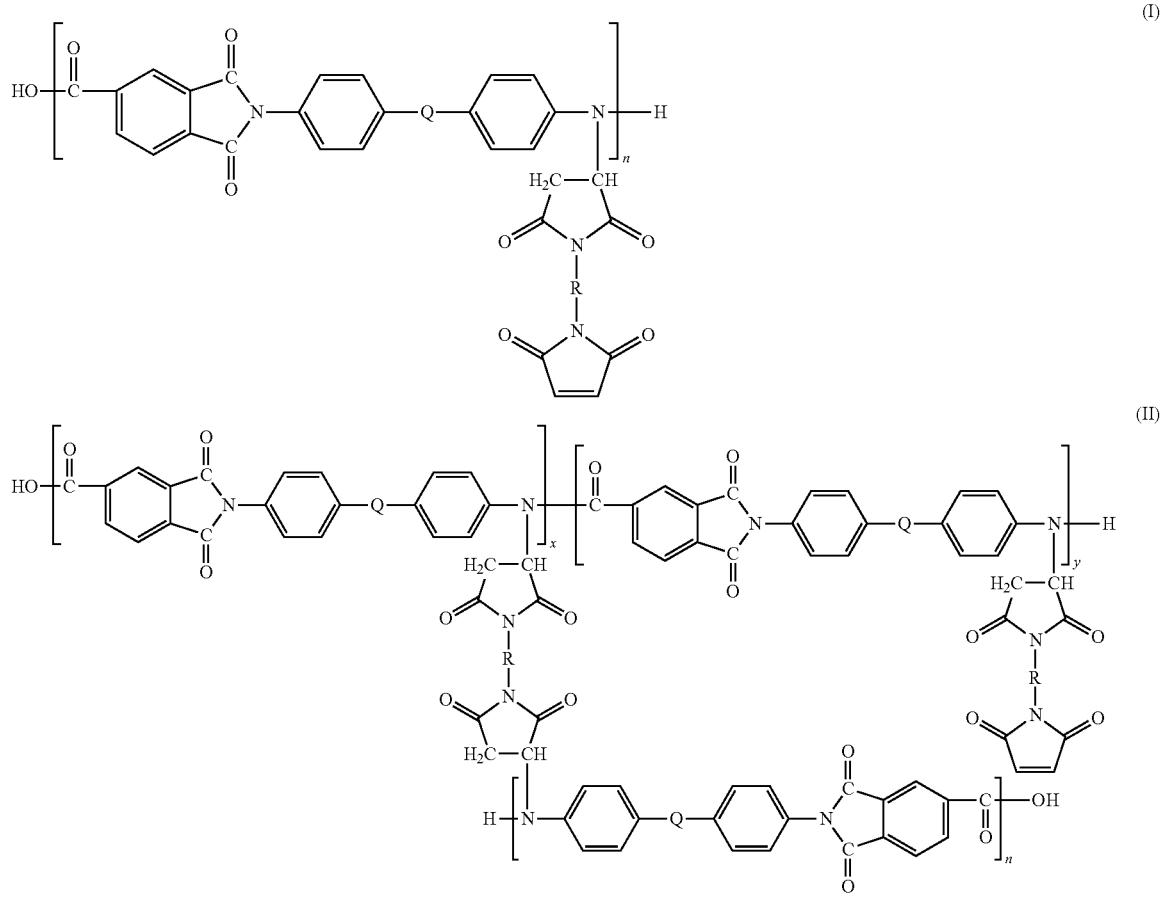

In Formula (I) or (II), Q is —CH$_2$—, —C(CH$_3$)$_2$—, —O—, —S—, —SO$_2$— or null, R is —(CH$_2$)$_2$—, —(CH$_2$)$_6$—, —(CH$_2$)$_8$—, —(CH$_2$)$_{12}$—, —CH$_2$—C(CH$_3$)$_2$—CH$_2$—CH(CH$_3$)—CH$_2$—CH$_2$—,

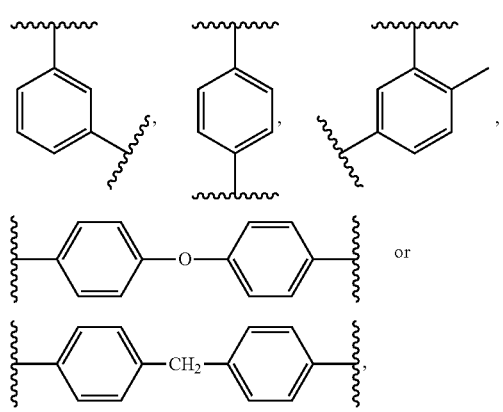

10<n<500, and x+y=n.

One embodiment of the invention provides a method for preparing a modified bismaleimide resin comprising blending amideimide resin and bismaleimide to form a mixture and heating the mixture to form the disclosed modified bismaleimide resin of Formula (I) or (II).

One embodiment of the invention provides a modified bismaleimide resin composition comprising the disclosed modified bismaleimide resin of Formula (I) or (II) and thermally conductive filler.

The invention provides a highly thermal resistant and flame retardant resin, a reactive amideimide-modified bismaleimide resin which is both halogen-free and phosphorus-free and is formed by reacting amideimide (AI) resin and bismaleimide (BMI). The disclosed modified bismaleimide resin with high glass transition temperature, high thermal resistance and flame retardant ability is widely applied in, for example, printed circuit board substrate materials and semiconductor package materials. The thermal conductivity of the modified bismaleimide resin is improved by the addition of thermally conductive filler which facilitates use as a thermal management material applied in interface or heat-dissipating path.

A detailed description is given in the following embodiments.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

One embodiment of the invention provides a modified bismaleimide resin of Formula (I) or (II).

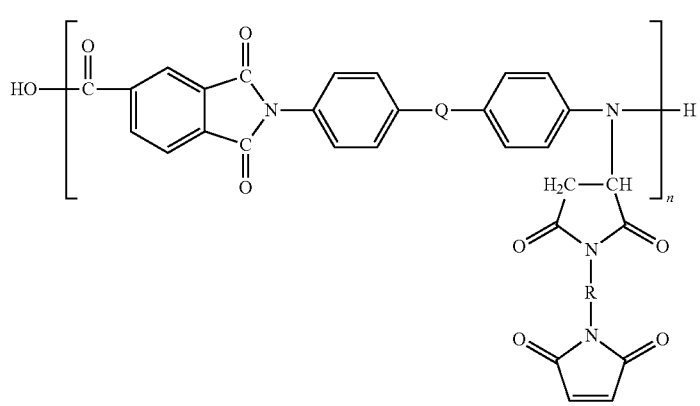

(I)

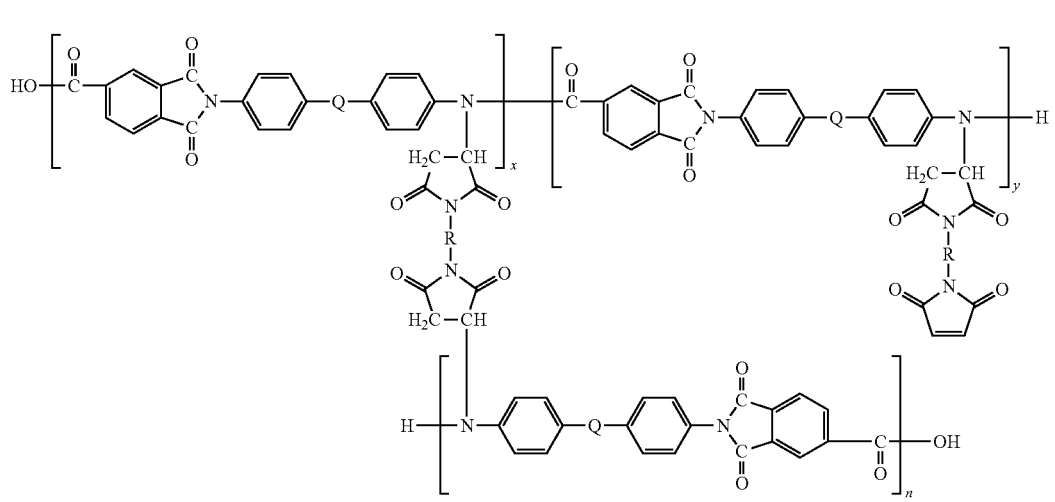

(II)

In Formula (I) or (II), Q may be —$CH_2$—, —$C(CH_3)_2$—, —O—, —S—, —$SO_2$— or null (the two phenyl groups connected with Q are directly connected). R may be —$(CH_2)_2$—, —$(CH_2)_6$—, —$(CH_2)_8$—, —$(CH_2)_{12}$—, —$CH_2$—$C(CH_3)_2$—$CH_2$—$CH(CH_3)$—$CH_2$—$CH_2$—,

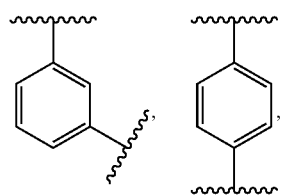

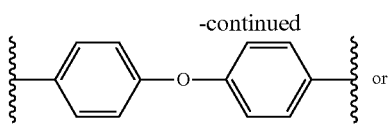

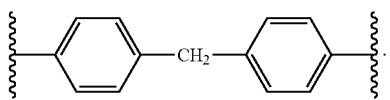

$10 < n < 500$. $x+y=n$.

The disclosed modified bismaleimide resin may be a thermally resistant dielectric insulation material, capable of wide application in, for example flexible circuit boards, rigid circuit boards, integrated circuit packages, liquid crystal display packages or light-emitting diode packages.

One embodiment of the invention provides a method for preparing a modified bismaleimide resin, comprising the following steps. An amideimide resin and bismaleimide are blended to form a mixture. The mixture is then heated to form the disclosed modified bismaleimide resin of Formula (I) or (II).

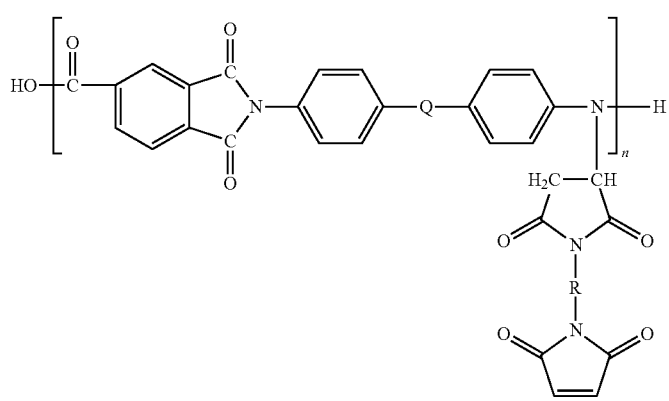
(I)

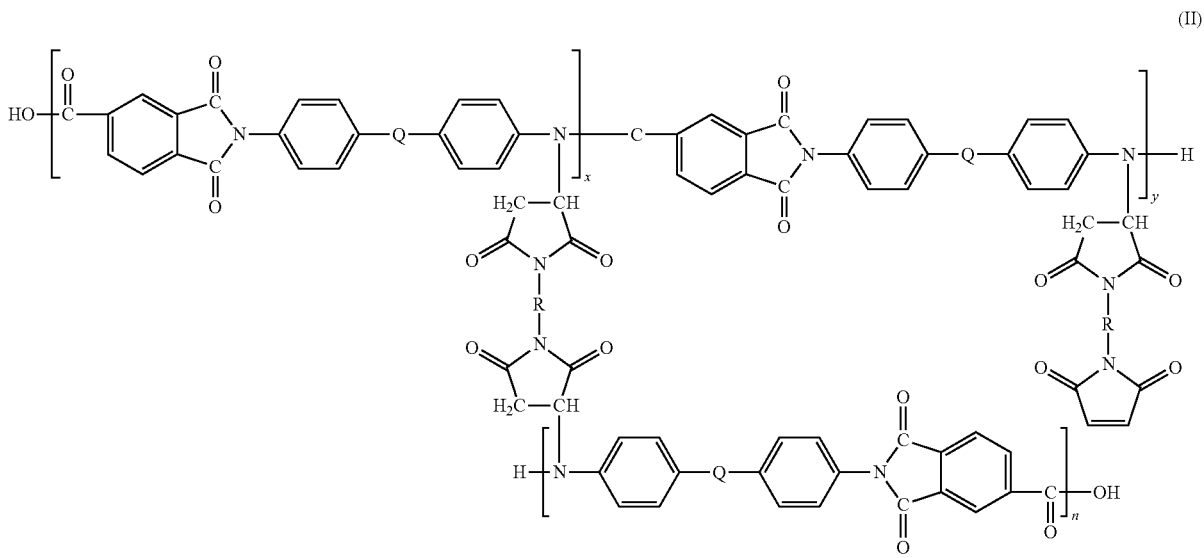
(II)

In Formula (I) or (II), Q may be —CH$_2$—, —C(CH$_3$)$_2$—, —O—, —S—, —SO$_2$— or null (the two phenyl groups connected with Q are directly connected). R may be —(CH$_2$)$_2$—, —(CH$_2$)$_6$—, —(CH$_2$)$_8$—, —(CH$_2$)$_{12}$—, —CH$_2$—C(CH$_3$)$_2$—CH$_2$—CH(CH$_3$)—CH$_2$—CH$_2$—,

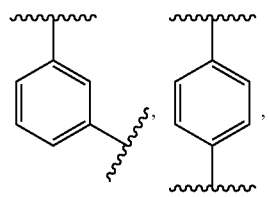

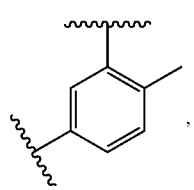

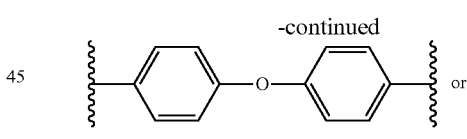

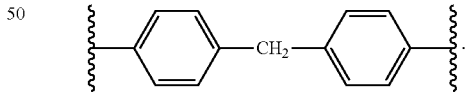

$10 < n < 500$. $x+y=n$.

In the mixture of the amideimide resin and bismaleimide, the amideimide resin has a weight ratio of about 25-65 parts by weight, based on 100 parts by weight of the mixture. The bismaleimide has a weight ratio of about 35-75 parts by weight, based on 100 parts by weight of the mixture.

In the step of heating the mixture, the heating temperature is about 120-140° C. The reaction time is about 2-4 hours.

One embodiment of the invention provides a modified bismaleimide resin composition comprising the disclosed modified bismaleimide resin of Formula (I) or (II) and thermally conductive filler.

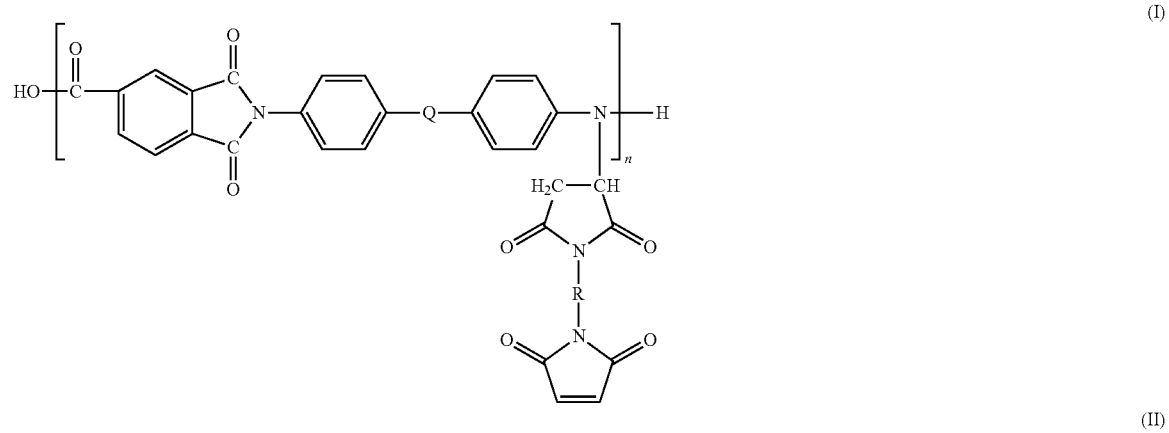

(I)

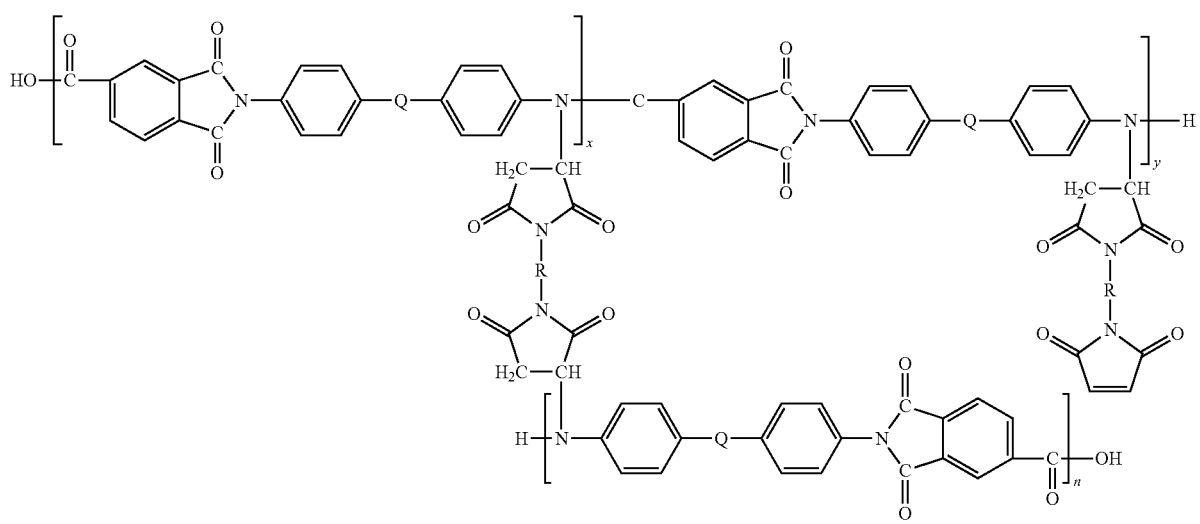

(II)

In Formula (I) or (II), Q may be —CH$_2$—, —C(CH$_3$)$_2$—, —O—, —S—, —SO$_2$— or null (the two phenyl groups connected with Q are directly connected). R may be —(CH$_2$)$_2$—, —(CH$_2$)$_6$—, —(CH$_2$)$_8$—, —(CH$_2$)$_{12}$—, —CH$_2$—C(CH$_3$)$_2$—CH$_2$—CH(CH$_3$)—CH$_2$—CH$_2$—,

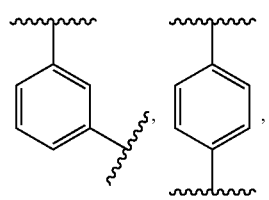

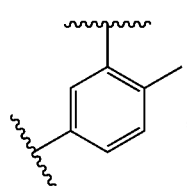

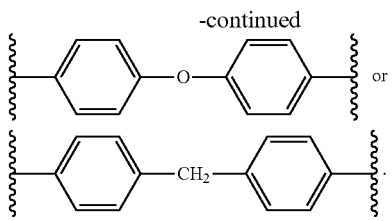

$10 < n < 500$. $x + y = n$.

In the disclosed modified bismaleimide resin composition, the modified bismaleimide resin has a weight ratio of about 20-50 parts by weight, based on 100 parts by weight of the modified bismaleimide resin composition. The thermally conductive filler has a weight ratio of about 50-80 parts by weight, based on 100 parts by weight of the modified bismaleimide resin composition.

The thermally conductive filler may comprise aluminum oxide, aluminum nitride, silicon carbide, boron nitride or a mixture thereof.

The disclosed modified bismaleimide resin composition may be a thermal management material utilized in interface or heat-dissipating path, capable of wide application in products such as flexible circuit boards, rigid circuit boards, integrated circuit packages, liquid crystal display packages or light-emitting diode packages.

The invention provides a highly thermally resistant and flame retardant resin, a reactive amideimide-modified bismaleimide resin that is halogen-free and phosphorus-free and is formed by a reaction of amideimide (AI) resin and bismaleimide (BMI). The disclosed modified bismaleimide resin with high glass transition temperature, high thermal resistance and flame retardant ability is widely applied in, for example printed circuit board substrate materials and semiconductor package materials. The thermal conductivity of the modified bismaleimide resin is improved by the addition of the thermally conductive filler, which facilitates use as a thermal management material applied in interface or heat-dissipating path.

In the invention, the amideimide (AI) resin and bismaleimide (BMI) are reacted under a proper heating temperature and reaction time to form a homogeneous phase reactive amideimide-modified bismaleimide resin. High thermally resistant and flame retardant resins that are halogen-free and phosphorus-free with various flexibility, gel time and resin flow are prepared by altering the ratio of the amideimide (AI) resin and bismaleimide (BMI). The disclosed modified bismaleimide resin with superior flexibility and thermal stability achieves the UL-94 V0 flame retardant level without the addition of halogen-containing flame retardants, phosphorus-containing flame retardants and any inorganic filler. Additionally, after being blended with the high thermally conductive filler, a highly thermally conductive, highly thermal resistant and flame retardant resin composition that is halogen-free and phosphorus-free is obtained.

Example 1

Preparation of Modified Bismaleimide Resin I 62 g of amideimide (AI) resin solution (Fu-Pao Chemical Co., solid content: 43.5%, 26.97 g of amideimide resin, Q is —$CH_2$—, referring to Formula (I)), 67.4 g of bismaleimide (BMI) (KI Chemical Co., R is

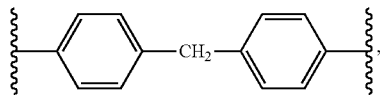

referring to Formula (I)) and 114 g of 1-methyl-2-pyrrolidone (NMP) (C-ECHO Co.) were added to a 500 ml glass reactor and uniformly stirred using a two-impeller stir bar at 120-140° C. for 2-4 hours until the resin was completely dissolved. After cooling to room temperature, a flame retardant modified bismaleimide resin that was halogen-free and phosphorus-free was prepared. In the modified bismaleimide resin, the amideimide resin had a weight ratio of 28.6 parts by weight, based on 100 parts by weight of the modified bismaleimide resin. The bismaleimide had a weight ratio of about 71.4 parts by weight, based on 100 parts by weight of the modified bismaleimide resin.

Example 2

Preparation of Modified Bismaleimide Resin II 110 g of amideimide (AI) resin solution (Fu-Pao Chemical Co., solid content: 43.5%, 47.85 g of amideimide resin, Q is —$CH_2$—, referring to Formula (I)), 67.4 g of bismaleimide (BMI) (KI Chemical Co., R is

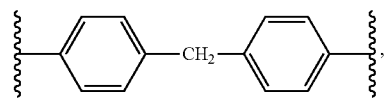

referring to Formula (I)) and 114 g of 1-methyl-2-pyrrolidone (NMP) (C-ECHO Co.) were added to a 500 ml glass reactor and uniformly stirred using a two-impeller stir bar under 120-140° C. for 2-4 hours until completely dissolved. After cooling to room temperature, a flame retardant modified bismaleimide resin that was halogen-free and phosphorus-free was prepared. In the modified bismaleimide resin, the amideimide resin had a weight ratio of 41.5 parts by weight, based on 100 parts by weight of the modified bismaleimide resin. The bismaleimide had a weight ratio of about 58.5 parts by weight, based on 100 parts by weight of the modified bismaleimide resin.

Example 3

Preparation of Modified Bismaleimide Resin III 285 g of amideimide (AI) resin solution (Fu-Pao Chemical Co., solid content: 43.5%, 123.98 g of amideimide resin, Q is —$CH_2$—, referring to Formula (I)), 67.4 g of bismaleimide (BMI) (KI Chemical Co., R is

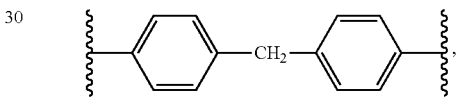

referring to Formula (I)) and 114 g of 1-methyl-2-pyrrolidone (NMP) (C-ECHO Co.) were added to a 500 ml glass reactor and uniformly stirred using a two-impeller stir bar under 120-140° C. for 2-4 hours until completely dissolved. After cooling to room temperature, a flame retardant modified bismaleimide resin with halogen-free and phosphorus-free was prepared. In the modified bismaleimide resin, the amideimide resin had a weight ratio of 64.8 parts by weight, based on 100 parts by weight of the modified bismaleimide resin. The bismaleimide had a weight ratio of about 35.2 parts by weight, based on 100 parts by weight of the modified bismaleimide resin.

Example 4

Preparation of Modified Bismaleimide Resin Composition I 110 g of amideimide (AI) resin solution (Fu-Pao Chemical Co., solid content: 43.5%, 47.85 g of amideimide resin, Q is —$CH_2$—, referring to Formula (I)), 67.4 g of bismaleimide (BMI) (KI Chemical Co., R is

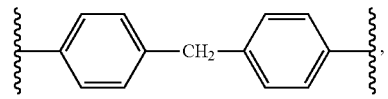

referring to Formula (I)) and 114 g of 1-methyl-2-pyrrolidone (NMP) (C-ECHO Co.) were added to a 500 ml glass reactor and uniformly stirred using a two-impeller stir bar under 120-140° C. for 2-4 hours until completely dissolved. After cooling to room temperature, a flame retardant modified bismaleimide resin which was halogen-free and phosphorus-free was prepared. In the modified bismaleimide resin, the amideimide resin had a weight ratio of 41.5 parts by weight, based on 100 parts by weight of the modified bismaleimide resin. The bismaleimide had a weight ratio of about 58.5 parts by weight, based on 100 parts by weight of the modified bismaleimide resin. Next, 115.25 g of silicon carbide (SiC) (Kallex Co.) was added to the glass reactor and stirred. A flame retardant and high thermally conductive modified bismaleimide resin composition that was halogen-free and phosphorus-free was prepared. In the composition, the modified bismaleimide resin had a weight ratio of 50 parts by weight, based on 100 parts by weight of the composition. The silicon carbide had a weight ratio of 50 parts by weight, based on 100 parts by weight of the composition.

Example 5

Preparation of Modified Bismaleimide Resin Composition II 110 g of amideimide (AI) resin solution (Fu-Pao Chemical Co., solid content: 43.5%, 47.85 g of amideimide resin, Q is —$CH_2$—, referring to Formula (I)), 67.4 g of bismaleimide (BMI) (KI Chemical Co., R is

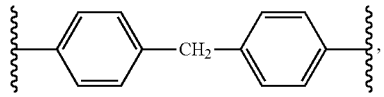

referring to Formula (I)) and 114 g of 1-methyl-2-pyrrolidone (NMP) (C-ECHO Co.) were added to a 500 ml glass reactor and uniformly stirred using a two-impeller stir bar under 120-140° C. for 2-4 hours until completely dissolved. After cooling to room temperature, a flame retardant modified bismaleimide resin that was halogen-free and phosphorus-free was prepared. In the modified bismaleimide resin, the amideimide resin had a weight ratio of 41.5 parts by weight, based on 100 parts by weight of the modified bismaleimide resin. The bismaleimide had a weight ratio of about 58.5 parts by weight, based on 100 parts by weight of the modified bismaleimide resin. Next, 115.25 g of aluminum oxide ($Al_2O_3$) (Showa Denko Co.) was added to the glass reactor and stirred. A flame retardant and highly thermally conductive modified bismaleimide resin composition that was halogen-free and phosphorus-free was prepared. In the composition, the modified bismaleimide resin had a weight ratio of 50 parts by weight, based on 100 parts by weight of the composition. The aluminum oxide had a weight ratio of 50 parts by weight, based on 100 parts by weight of the composition.

Example 6

Preparation of Modified Bismaleimide Resin Composition III 110 g of amideimide (AI) resin solution (Fu-Pao Chemical Co., solid content: 43.5%, 47.85 g of amideimide resin, Q is —$CH_2$—, referring to Formula (I)), 67.4 g of bismaleimide (BMI) (KI Chemical Co., R is

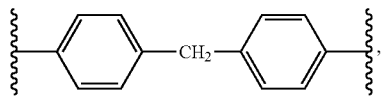

referring to Formula (I)) and 114 g of 1-methyl-2-pyrrolidone (NMP) (C-ECHO Co.) were added to a 500 ml glass reactor and uniformly stirred using a two-impeller stir bar under 120-140° C. for 2-4 hours until completely dissolved. After cooling to room temperature, a flame retardant modified bismaleimide resin that was halogen-free and phosphorus-free was prepared. In the modified bismaleimide resin, the amideimide resin had a weight ratio of 41.5 parts by weight, based on 100 parts by weight of the modified bismaleimide resin. The bismaleimide had a weight ratio of about 58.5 parts by weight, based on 100 parts by weight of the modified bismaleimide resin. Next, 268.92 g of aluminum oxide ($Al_2O_3$) (Showa Denko Co.) was added to the glass reactor and stirred. A flame retardant and highly thermally conductive modified bismaleimide resin composition which was halogen-free and phosphorus-free was prepared. In the composition, the modified bismaleimide resin had a weight ratio of 30 parts by weight, based on 100 parts by weight of the composition. The aluminum oxide had a weight ratio of 70 parts by weight, based on 100 parts by weight of the composition.

Comparative Example 1

Preparation of Modified Epoxy Resin I 110 g of amideimide (AI) resin solution (Fu-Pao Chemical Co., solid content: 43.5%, 47.85 g of amideimide resin), 67.3 g of epoxy resin (828EL) (Shell Chemical Co.) and 13.3 g of 1-methyl-2-pyrrolidone (NMP) (C-ECHO Co.) were added to a 500 ml glass reactor and uniformly stirred using a two-impeller stir bar under 80-90° C. for 2-4 hours until completely dissolved. After cooling to room temperature, 13.3 g of 4,4-diaminodiphenyl sulfone (DDS) (Ciba Chemical Co.) was added to the glass reactor and stirred. A modified epoxy resin which was halogen-free and phosphorus-free was prepared.

Comparative Example 2

Preparation of Modified Epoxy Resin Composition I 110 g of amideimide (AI) resin solution (Fu-Pao Chemical Co., solid content: 43.5%, 47.85 g of amideimide resin), 67.3 g of epoxy resin (828EL) (Shell Chemical Co.) and 13.3 g of 1-methyl-2-pyrrolidone (NMP) (C-ECHO Co.) were added to a 500 ml glass reactor and uniformly stirred using a two-impeller stir bar under 80-90° C. for 2-4 hours until completely dissolved. After cooling to room temperature, 13.3 g of 4,4-diaminodiphenyl sulfone (DDS) (Ciba Chemical Co.) and 115.25 g of aluminum hydroxide (Al(OH)$_3$) (Showa Denko Co.) were added to the glass reactor and stirred. A modified epoxy resin composition which was halogen-free and phosphorus-free was prepared.

The physical properties of the modified bismaleimide resins and their compositions prepared from Examples 1-6 and the conventional modified epoxy resin and its composition prepared from Comparative Examples 1-2 were shown in Table 1.

TABLE 1

| | AI (g) | BMI (g) | 828EL (g) | DDS (g) | SiC (g) | Al$_2$O$_3$ (g) | Al(OH)$_3$ (g) | K | α | Tg | CTE | UL-94 |
|---|---|---|---|---|---|---|---|---|---|---|---|---|
| Example 1 | 62 | 67.4 | — | — | — | — | — | 0.80 | 0.45 | 273 | 50 | V0 |
| Example 2 | 110 | 67.4 | — | — | — | — | — | 0.80 | 0.47 | 254 | 55 | V0 |
| Example 3 | 285 | 67.4 | — | — | — | — | — | 0.81 | 0.48 | 230 | 58 | V0 |
| Example 4 | 110 | 67.4 | — | — | 115.25 | — | — | 1.64 | 0.93 | 221 | 40 | V0 |
| Example 5 | 110 | 67.4 | — | — | — | 115.25 | — | 1.15 | 0.58 | 219 | 46 | V0 |
| Example 6 | 110 | 67.4 | — | — | — | 268.92 | — | 1.31 | 0.70 | 220 | 38 | V0 |
| Comparative Example 1 | 110 | — | 67.3 | 13.3 | — | — | — | 0.79 | 0.45 | 165 | 58 | V1 |
| Comparative Example 2 | 110 | — | 67.3 | 13.3 | — | — | 115.25 | 0.84 | 0.48 | 168 | 45 | V0 |

K: thermal conductivity (W/m × °C);
α: thermal diffusivity (mm$^2$/s);
Tg: glass transition temperature (°C);
CTE: coefficient of thermal expansion (ppm/°C.)

The results from Table 1 indicated that the modified bismaleimide resins and their compositions prepared from Examples 1-6 had better flame retardant property than that of the conventional modified epoxy resin and its composition prepared from Comparative Examples 1-2. Specifically, the modified bismaleimide resin compositions prepared from Examples 4-6 simultaneously possessed high thermal conductivity and flame retardant properties.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A modified bismaleimide resin of Formula (I) or (II):

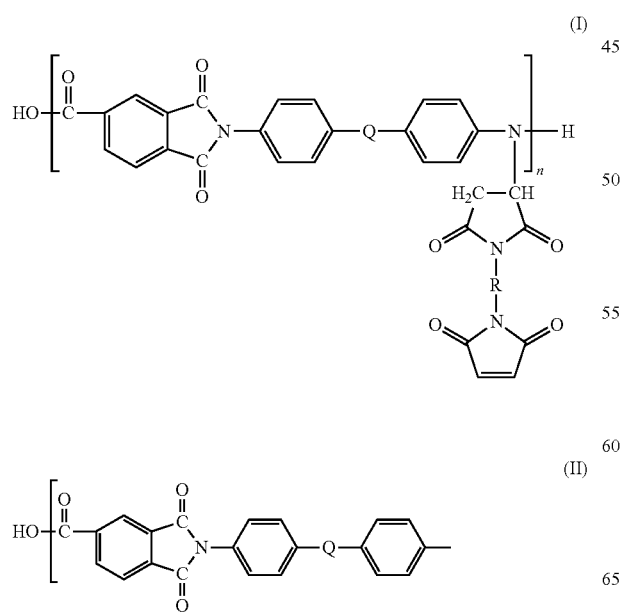

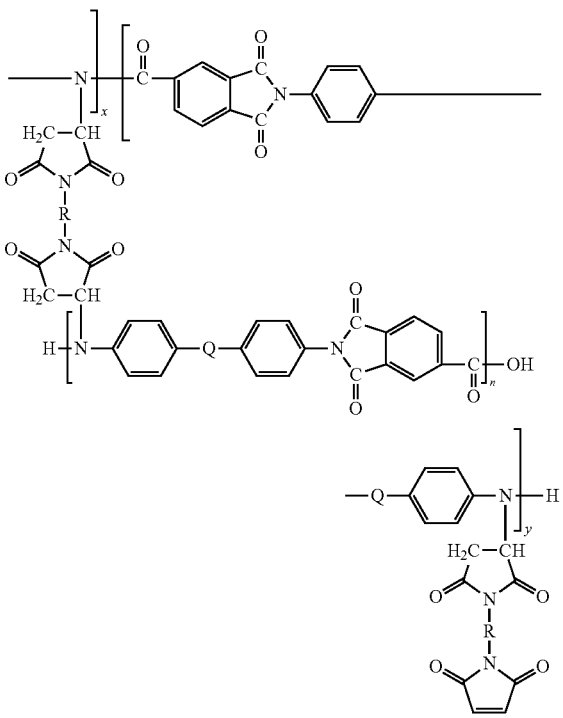

wherein

Q is —CH$_2$—, —C(CH$_3$)$_2$—, —O—, —S—, —SO$_2$— or null;

R is —(CH$_2$)$_2$—, —(CH$_2$)$_6$—, —(CH$_2$)$_8$—, —(CH$_2$)$_{12}$—, —CH$_2$—C(CH$_3$)$_2$—CH$_2$—CH(CH$_3$)—CH$_2$—CH$_2$—,

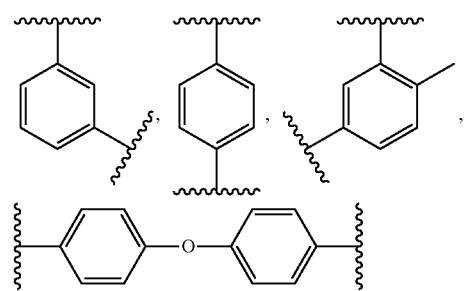

-continued

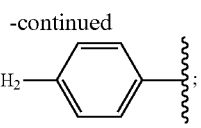

or

10<n<500; and x+y=n.

2. The modified bismaleimide resin as claimed in claim 1, wherein the modified bismaleimide resin is a thermally resistant dielectric insulation material.

3. The modified bismaleimide resin as claimed in claim 1, wherein the modified bismaleimide resin is applied in flexible circuit board, rigid circuit board, integrated circuit package, liquid crystal display package or light-emitting diode package.

4. A method for preparing a modified bismaleimide resin, comprising:
   blending amideimide resin and bismaleimide to form a mixture; and
   heating the mixture to form a modified bismaleimide resin as claimed in claim 1.

5. The method for preparing a modified bismaleimide resin as claimed in claim 4, wherein the amideimide resin has a weight ratio of 25-65 parts by weight, based on 100 parts by weight of the mixture.

6. The method for preparing a modified bismaleimide resin as claimed in claim 4, wherein the bismaleimide has a weight ratio of 35-75 parts by weight, based on 100 parts by weight of the mixture.

7. A modified bismaleimide resin composition, comprising:
   a modified bismaleimide resin as claimed in claim 1; and
   thermally conductive filler.

8. The modified bismaleimide resin composition as claimed in claim 7, wherein the modified bismaleimide resin has a weight ratio of 20-50 parts by weight, based on 100 parts by weight of the modified bismaleimide resin composition.

9. The modified bismaleimide resin composition as claimed in claim 7, wherein the thermally conductive filler has a weight ratio of 50-80 parts by weight, based on 100 parts by weight of the modified bismaleimide resin composition.

10. The modified bismaleimide resin composition as claimed in claim 7, wherein the thermally conductive filler comprises aluminum oxide, aluminum nitride, silicon carbide, boron nitride or a mixture thereof.

11. The modified bismaleimide resin composition as claimed in claim 7, wherein the modified bismaleimide resin composition is a thermal management material utilized in interface or heat-dissipating path.

12. The modified bismaleimide resin composition as claimed in claim 7, wherein the modified bismaleimide resin composition is applied in flexible circuit boards, rigid circuit boards, integrated circuit packages, liquid crystal display packages or light-emitting diode packages.

* * * * *